United States Patent [19]
Krueger

[11] Patent Number: 5,825,294
[45] Date of Patent: Oct. 20, 1998

[54] THERMOSTATIC HEAT DETECTOR

[76] Inventor: Huck H. O. Krueger, 803 3rd Ave., Cando, N. Dak. 58324

[21] Appl. No.: 906,119

[22] Filed: Jul. 25, 1997

[51] Int. Cl.⁶ .................................................. G08B 17/06
[52] U.S. Cl. ......................... 340/594; 337/360; 337/362; 337/376; 374/206
[58] Field of Search .................................... 340/584, 594; 374/205, 206; 116/221; 236/94; 337/349, 351, 360, 362, 372, 376

[56] References Cited

U.S. PATENT DOCUMENTS

| | | | |
|---|---|---|---|
| 2,698,890 | 1/1955 | Hughes et al. | 340/594 X |
| 2,762,887 | 9/1956 | Frankfurt | 337/349 |
| 3,254,534 | 6/1966 | Graham | 374/206 |
| 3,628,494 | 12/1971 | Bilotta | 116/102 |
| 3,818,763 | 6/1974 | Berleyoung et al. | 374/206 |
| 4,503,800 | 3/1985 | Schliep | 116/221 |
| 4,636,776 | 1/1987 | Leaming | 340/594 |
| 4,695,829 | 9/1987 | Everett et al. | 340/594 X |

*Primary Examiner*—Thomas J. Mullen, Jr.

[57] ABSTRACT

A heat detection and alarm unit is provided including a housing with a front face, a rear face, a top face, a bottom face and a pair of side faces coupled therebetween defining an interior space. A speaker is situated within the interior space of the housing. The speaker is adapted to emit an audible tone upon the supply of power thereto. A coiled thermostat is provided having a first end located at the center thereof rotatably coupled within the interior space of the housing. The coiled thermostat has a second end with a conductive hammer coupled thereto. Next provided is a battery mounted within the housing for powering purposes. An electrical assembly including a contact is mounted adjacent the conductive hammer. Upon the detection of a predetermined temperature, the hammer engages the contact thereby supplying power to the speaker.

5 Claims, 2 Drawing Sheets

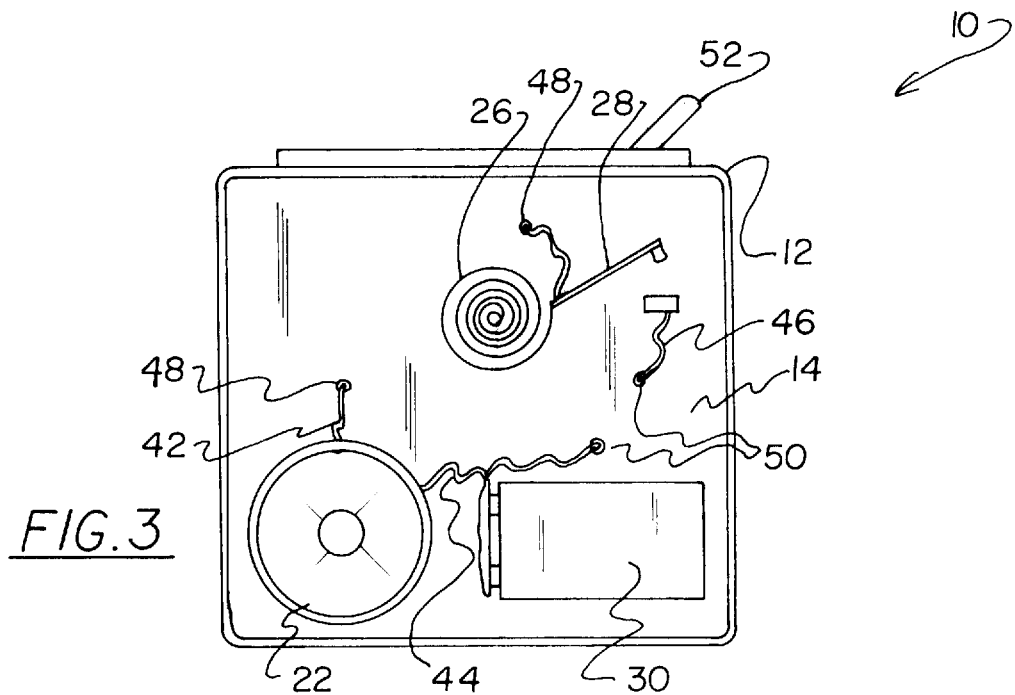
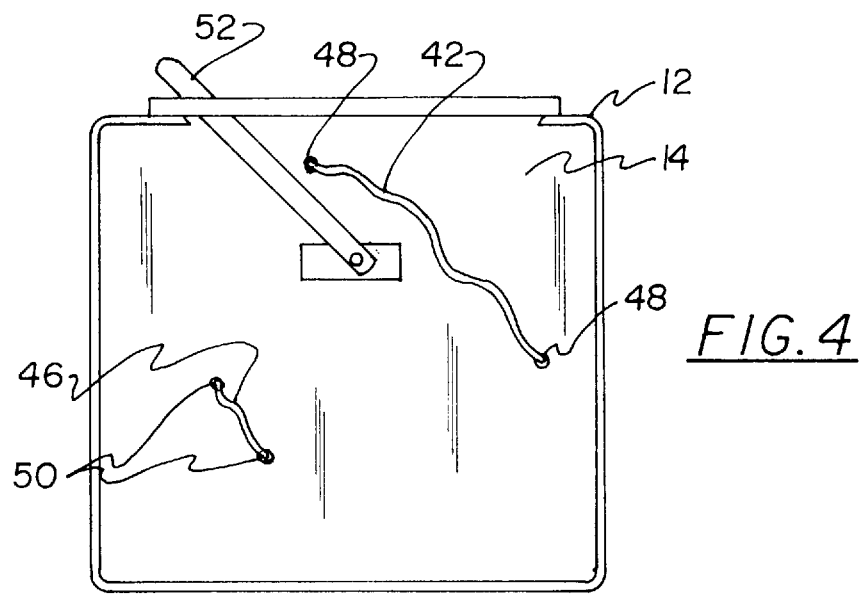

THERMOSTATIC HEAT DETECTOR

BACKGROUND OF THE INVENTION

1. Field of the Invention

The present invention relates to heat detectors and more particularly pertains to a new THERMOSTATIC HEAT DETECTOR for indicating when a temperature of the environment has increased to a predetermined level.

2. Description of the Prior Art

The use of heat detectors is known in the prior art. More specifically, heat detectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art heat detectors include U.S. Pat. No. 5,450,065; U.S. Pat. No. 5,450,066; U.S. Pat. No. 4,225,860; U.S. Pat. No. Des. 308,177; U.S. Pat. No. Des. 246,701; and U.S. Pat. No. 4,020,479.

In these respects, the THERMOSTATIC HEAT DETECTOR according to the present invention substantially departs from the conventional concepts and designs of the prior art, and in so doing provides an apparatus primarily developed for the purpose of indicating when a temperature of the environment has increased to a predetermined level.

SUMMARY OF THE INVENTION

In view of the foregoing disadvantages inherent in the known types of heat detectors now present in the prior art, the present invention provides a new THERMOSTATIC HEAT DETECTOR construction wherein the same can be utilized for indicating when a temperature of the environment has increased to a predetermined level.

The general purpose of the present invention, which will be described subsequently in greater detail, is to provide a new THERMOSTATIC HEAT DETECTOR apparatus and method which has many of the advantages of the heat detectors mentioned heretofore and many novel features that result in a new THERMOSTATIC HEAT DETECTOR which is not anticipated, rendered obvious, suggested, or even implied by any of the prior art heat detectors, either alone or in any combination thereof.

To attain this, the present invention generally comprises a plastic housing having a rectilinear configuration. As shown in the Figures, the housing has a front face, a rear face, a top face, a bottom face and a pair of side faces coupled therebetween defining an interior space. The housing has a divider plate coupled between front face and the rear face in parallel therewith. As shown in FIG. 1, the front face has a plurality of apertures configured in a circular orientation. One of the side faces has a thin elongated window formed therein between the top and bottom face of the housing. Note FIG. 2. Linear aligned indicia is printed adjacent thereto representative of various temperatures. A speaker is situated within the interior space of the housing and mounted on a first surface of the divider plate adjacent the apertures thereof. In use, the speaker is adapted to emit an audible tone upon the supply of power thereto. Next provided is a coiled thermostat having a first end located at the center thereof. Such first end is rotatably coupled to the first surface of the divider plate within the interior space of the housing. The coiled thermostat further has a second end with a conductive hammer coupled thereto, as shown in FIG. 3. A battery is mounted to the first surface of the divider plate within the housing. An electrical assembly is provided including a first wire connected between a first end of the conductive hammer and the speaker. A second wire is connected between the battery and the speaker. Lastly, a third wire is connected between the battery and a contact mounted on the first surface of the divider plate adjacent the conductive hammer. By this structure, upon the detection of a predetermined temperature, the hammer engages the contact thereby supplying power to the speaker. Also included is a thermostat adjustment arm having a first end rotatably coupled to a second surface of the divider plate. It is important to note that the first end of the arm is further fixedly coupled with respect to the first end of the coiled thermostat. The thermostat adjustment arm has a second end extending through the window for allowing the rotation of the coiled thermostat. Such rotation in turn effects the adjusting of a distance between a second end of the conductive hammer and the contact. As such, the temperature at which power is supplied to the speaker may be manually selected.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new THERMOSTATIC HEAT DETECTOR apparatus and method which has many of the advantages of the heat detectors mentioned heretofore and many novel features that result in a new THERMOSTATIC HEAT DETECTOR which is not anticipated, rendered obvious, suggested, or even implied by any of the prior art heat detectors, either alone or in any combination thereof.

It is another object of the present invention to provide a new THERMOSTATIC HEAT DETECTOR which may be easily and efficiently manufactured and marketed.

It is a further object of the present invention to provide a new THERMOSTATIC HEAT DETECTOR which is of a durable and reliable construction.

An even further object of the present invention is to provide a new THERMOSTATIC HEAT DETECTOR which is conducive to a low cost of manufacture with regard to both materials and labor, and which accordingly is then conducive to low prices of sale to the consuming public, thereby making such THERMOSTATIC HEAT DETECTOR economically available to the buying public.

Still yet another object of the present invention is to provide a new THERMOSTATIC HEAT DETECTOR which provides in the apparatuses and methods of the prior art some of the advantages thereof, while simultaneously overcoming some of the disadvantages normally associated therewith.

Still another object of the present invention is to provide a new THERMOSTATIC HEAT DETECTOR for providing a heat detector and alarm system for indicating when a temperature of the environment has increased to a predetermined level.

Even still another object of the present invention is to provide a new THERMOSTATIC HEAT DETECTOR that includes a housing with a front face, a rear face, a top face, a bottom face and a pair of side faces coupled therebetween defining an interior space. A speaker is situated within the interior space of the housing. The speaker is adapted to emit an audible tone upon the supply of power thereto. A coiled thermostat is provided having a first end located at the center thereof rotatably coupled within the interior space of the housing. The coiled thermostat has a second end with a conductive hammer coupled thereto. Next provided is a battery mounted within the housing for powering purposes. An electrical assembly including a contact is mounted adjacent the conductive hammer. Upon the detection of a predetermined temperature, the hammer engages the contact thereby supplying power to the speaker.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention taken along line 3–3 shown in FIG. 2.

FIG. 4 is a cross-sectional view of the present invention taken along line 4—4 shown in FIG. 2.

DESCRIPTION OF THE PREFERRED EMBODIMENT

Figure 1:
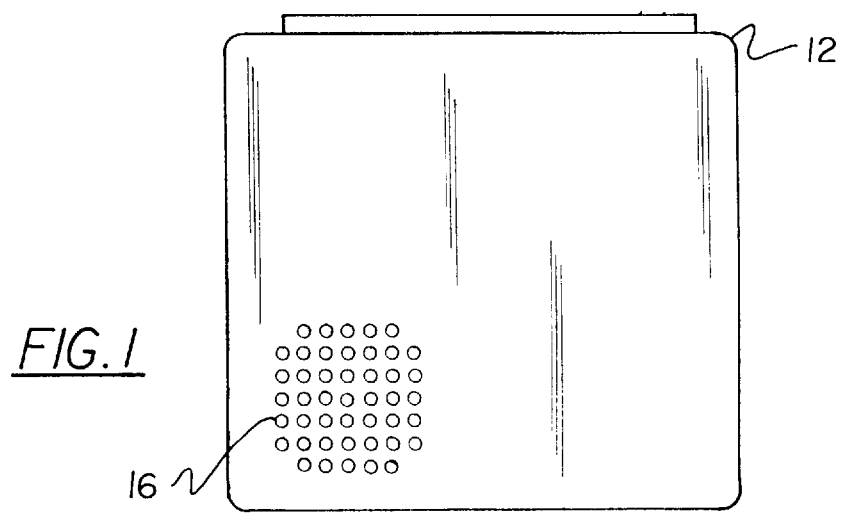
FIG. 1 is a front view of a new THERMOSTATIC HEAT DETECTOR according to the present invention.
Figure 2:
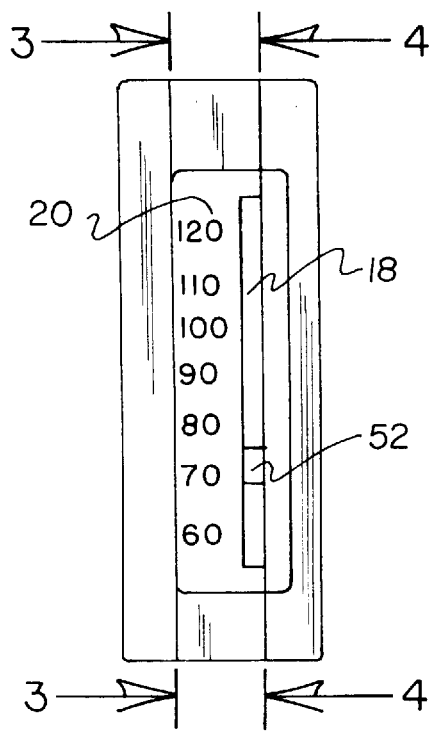
FIG. 2 is a side view of the present invention.

With reference now to the drawings, and in particular to FIGS. 1 through 4 thereof, a new THERMOSTATIC HEAT DETECTOR embodying the principles and concepts of the present invention and generally designated by the reference numeral 10 will be described.

The present invention includes a heat-resistant plastic housing 12 having a rectilinear configuration. In the alternative, the housing is constructed from a metal. As shown in the Figures, the housing has a front face, a rear face, a top face, a bottom face and a pair of side faces coupled therebetween defining an interior space. Ideally, the housing has a length and width of 4 and ½ inches and a thickness of 1 and ¾ inches.

The housing has a divider plate 14 coupled between front face and the rear face in parallel therewith. As shown in FIG. 1, the front face has a plurality of apertures 16 configured in a circular orientation. One of the side faces has a thin elongated window 18 formed therein between the top and bottom face of the housing. Note FIG. 2. Linear aligned indicia 20 is printed adjacent to the window representative of various temperatures. In the preferred embodiment, the temperatures range from 65 to 120 degrees.

A speaker 22 is situated within the interior space of the housing and mounted on a first surface of the divider plate adjacent the apertures thereof. In use, the speaker is adapted to emit an audible tone upon the supply of power thereto. In the alternative, a piezo-electic buzzer may be utilized.

Next provided is a bi-metal coiled thermostat 26 having a first end located at the center thereof. Such first end is rotatably coupled to the first surface of the divider plate within the interior space of the housing. The coiled thermostat further has a second end with a conductive hammer 28 coupled thereto, as shown in FIG. 3. It should be noted that the coiled thermostat is adapted to react to heat much faster than a mercury controlled switch.

A battery 30 is mounted to the first surface of the divider plate within the housing. As shown in FIG. 3, such battery preferably comprises a square 9V battery. While not shown, a pair of integral prongs are preferably extended from the divider plate for containing the battery.

An electrical assembly 40 is provided including a first wire 42 connected between a first end of the conductive hammer and the speaker. A second wire 44 is connected between the battery and the speaker. Lastly, a third wire 46 is connected between the battery and a contact mounted on the first surface of the divider plate adjacent the conductive hammer. By this structure, upon the detection of a predetermined temperature, the hammer engages the contact thereby supplying power to the speaker. By use of the specific electrical assembly and coiled thermostat, the present invention has no static power dissipation associated therewith.

As shown in both FIGS. 3 & 4, the first wire 42 is preferably strung through apertures 48 formed in the divider plate adjacent the speaker and coiled thermostat, respectively. Further, the third wire 46 is strung through apertures 50 formed in the divider plate adjacent the contact and battery, respectively. As such, a majority of the lengths of the first and third wire reside on the second surface of the divider plate. It should be noted that the apertures function to keep the wires from interfering with the operation of the present invention.

Also included is a thermostat adjustment arm 52 having a first end rotatably coupled to the second surface of the divider plate. It is important to note that the first end of the arm is further fixedly coupled with respect to the first end of the coiled thermostat. The thermostat adjustment arm has a second end extending through the window for allowing the rotation of the coiled thermostat. Such rotation in turn effects the adjusting of a distance between a second end of the conductive hammer and the contact. As such, the temperature at which power is supplied to the speaker may be manually selected.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heat detection and alarm unit comprising, in combination:
    a plastic housing having a rectilinear configuration with a front face, a rear face, a top face, a bottom face and a pair of side faces coupled therebetween defining an interior space, the housing having a divider plate coupled between front face and the rear face in parallel therewith, the front face having a plurality of apertures configured in a circular orientation, one of the side faces having a thin elongated window formed therein between the top and bottom face of the housing with linear aligned indicia printed adjacent thereto representative of various temperatures;
    a speaker situated within the interior space of the housing and mounted on a first surface of the divider plate adjacent the apertures of the front face, the speaker adapted to emit an audible tone upon the supply of power thereto;
    a coiled thermostat having a first end located at the center thereof rotatably coupled to the first surface of the divider plate within the interior space of the housing, the coiled thermostat having a second end with a conductive hammer coupled thereto;
    a battery mounted to the first surface of the divider plate within the housing;
    an electrical assembly including a first wire connected between a first end of the conductive hammer and the speaker, a second wire connected between the battery and the speaker, and a third wire connected between the battery and a contact mounted on the first surface of the divider plate adjacent the conductive hammer, whereby upon the detection of a predetermined temperature, the hammer engages the contact thereby supplying power to the speaker; and
    a thermostat adjustment arm having a first end rotatably coupled to a second surface of the divider plate and further fixedly coupled with respect to the first end of the coiled thermostat, the thermostat adjustment arm having a second end extending through the window for allowing the rotation of the coiled thermostat and adjusting a distance between a second end of the conductive hammer and the contact thereby adjusting the temperature at which power is supplied to the speaker.

2. A heat detection and alarm unit comprising:
    a housing with a front face, a rear face, a top face, a bottom face and a pair of side faces coupled therebetween defining an interior space;
    a speaker situated within the interior space of the housing, the speaker adapted to emit an audible tone upon the supply of power thereto;
    a coiled thermostat having a first end located at the center thereof rotatably coupled within the interior space of the housing, the coiled thermostat having a second end with a conductive hammer coupled thereto;
    a battery mounted within the housing; and
    an electrical assembly including a contact mounted adjacent the conductive hammer, whereby upon the detection of a predetermined temperature, the hammer engages the contact thereby supplying power to the speaker.

3. A heat detection and alarm unit as set forth in claim 2 and further including thermostat adjustment means for allowing the rotation of the coiled thermostat and adjustment of a distance between a second end of the conductive hammer and the contact thereby adjusting the temperature at which power is supplied to the speaker.

4. A heat detection and alarm unit as set forth in claim 3 wherein the thermostat adjustment means includes an arm with a first end fixedly coupled with respect to the first end of the coiled thermostat, the thermostat adjustment arm having a second end extending through a window formed in the housing.

5. A heat detection and alarm unit as set forth in claim 3 wherein the housing has a divider plate coupled between front face and the rear face thereof, the divider plate having a first surface with the coiled thermostat coupled thereto and a second surface with the thermostat adjustment means coupled thereto.

* * * * *